(12) United States Patent
Coursey

(10) Patent No.: US 8,893,597 B2
(45) Date of Patent: Nov. 25, 2014

(54) SHEET LIFTING DEVICE

(75) Inventor: David J. Coursey, Conyers, GA (US)

(73) Assignee: Atlas Die, LLC, Elkhart, IN (US)

( * ) Notice: Subject to any disclaimer, the term of this patent is extended or adjusted under 35 U.S.C. 154(b) by 421 days.

(21) Appl. No.: 13/234,267

(22) Filed: Sep. 16, 2011

(65) Prior Publication Data

US 2013/0068077 A1    Mar. 21, 2013

(51) Int. Cl.
*B26D 7/06* (2006.01)
*B26D 7/32* (2006.01)
*F16F 1/18* (2006.01)
*B26D 7/18* (2006.01)

(52) U.S. Cl.
CPC ...... *B26D 7/1818* (2013.01); *B26D 2007/1809* (2013.01); *F16F 1/18* (2013.01)
USPC ....... 83/13; 83/109; 83/111; 83/112; 267/158

(58) Field of Classification Search
USPC ............. 83/13, 117, 103, 116, 115, 140, 109, 83/111, 112, 23, 588, 55, 52; 267/158; 493/60, 64, 82, 83, 342, 373, 472, 401, 493/402; D8/367; 248/222.11, 22.12; 242/615; 198/617
See application file for complete search history.

(56) References Cited

U.S. PATENT DOCUMENTS

| | | | |
|---|---|---|---|
| 3,518,922 A | 7/1970 | Kuehn | |
| 3,946,627 A | 3/1976 | Hofmann | |
| 5,337,639 A | 8/1994 | Morrison | |
| 5,906,363 A * | 5/1999 | Reis et al. | 269/21 |
| D422,198 S | 4/2000 | Snell | |
| 6,644,153 B1 * | 11/2003 | Gordon | 83/27 |
| 6,659,927 B2 | 12/2003 | Myers et al. | |
| 6,692,425 B2 | 2/2004 | Myers et al. | |
| 6,779,426 B1 | 8/2004 | Holliday | |
| 6,792,840 B2 | 9/2004 | Myers et al. | |
| 6,807,888 B1 * | 10/2004 | Kiyohara et al. | 83/485 |
| 7,360,475 B2 | 4/2008 | Quercia | |
| 8,166,858 B2 * | 5/2012 | Luquette | 83/115 |
| 2002/0160899 A1 | 10/2002 | Myers et al. | |
| 2008/0066595 A1 * | 3/2008 | Coursey et al. | 83/14 |
| 2010/0037741 A1 | 2/2010 | Luquette | |
| 2013/0112053 A1 * | 5/2013 | Jakob | 83/23 |

* cited by examiner

*Primary Examiner* — Ghassem Alie
(74) *Attorney, Agent, or Firm* — Kilyk & Bowersox, P.L.L.C.

(57) ABSTRACT

A sheet lifting device is provided for lifting a sheet or web of material in a press. The device can include a base portion and a resilient, bendable arm extending from the base portion. The base portion can include a merge portion that connects the resilient, bendable arm to the rest of the base portion. A system is provided that includes the sheet lifting device mounted in a slot of a support frame, for example, in a blanking press. Methods of conveying a sheet or web of material using the system are also provided.

18 Claims, 5 Drawing Sheets

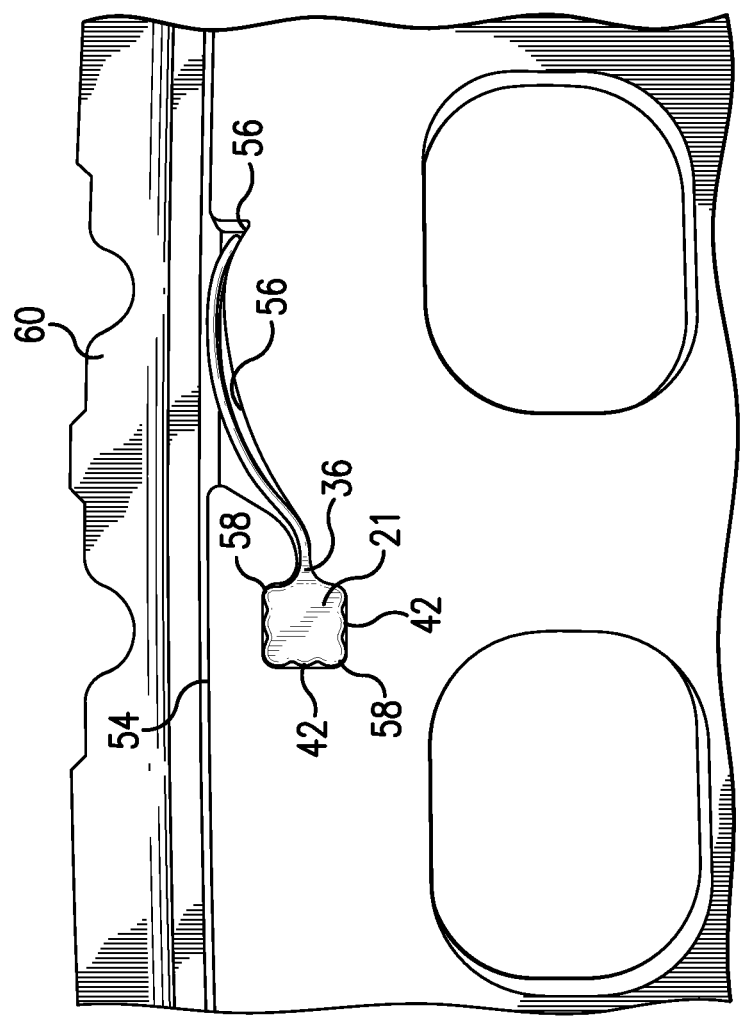

SHEET LIFTING DEVICE

FIELD

The present teachings relate to the field of die presses, for example, stripping presses, die-cutting presses, and blanking presses for manipulating sheets and webs of material.

BACKGROUND

Oftentimes sheet and webs of material become hung-up in a press, for example, becoming snagged in a die-cutting press, a stripping press, or a blanking press. Such hang-ups or snags require operator intervention and down time, during which the press cannot operate. Some sheet lifting devices for use in presses are known to exhibit problems, particularly in a blanking press. In blanking press operation, sheet-lifting devices are often too soft or pliable such that the resiliency does not provide a sufficient lifting force to lift a sheet skeleton off of the blanking press. Sheet-lifting devices that are sufficiently strong to provide a lifting force in a blanking press are often too rigid or inflexible such that presser bars used in the blanking press cannot fully compress. It is desirable to provide a sheet lifting device for a press, particularly for a blanking press, that is soft enough to fully compress yet strong enough to lift a skeleton off of the blanking press.

SUMMARY

The present teachings provide a sheet lifting device that can be used in a press for manipulating a sheet of web of material, for example, a paper or paperboard sheet. The sheet lifting device can comprise a base portion and a resilient, bendable arm extending from the base portion. The base portion can comprise a body having a first surface, a second surface opposite the first surface, at least a first sidewall, and at least one merge portion along the sidewall. In some embodiments, the sidewall can include a vertical portion and the merge portion can be provided along the vertical portion. The merge portion can merge into the resilient, bendable arm. In some embodiments, the resilient, bendable arm extends substantially horizontally form the merge portion, then curves upwardly in a first direction, and then curves in a substantially opposite direction to again extend substantially horizontally. The base portion can have a top surface and/or the vertical portion can have a top. As the resilient, bendable arm curves upwardly in the first direction, it can extend above the top of the vertical portion and/or above the top surface of the base portion.

According to various embodiments, a system is provided that comprises a support frame, for example, a retaining board or rail of a blanking press. A sheet lifting device as described herein can be mounted in a slot in the support frame, such that the resilient, bendable arm rises above a top, sheet-supporting surface of the support frame. The support frame can further comprise a recess to accommodate the resilient, bendable arm, when the resilient, bendable arm is bent downwardly under a force acting to press a sheet or web against the sheet-supporting surface of the support frame. The slot in the support frame can have an inner sidewall that is substantially complementary to an outer sidewall of the base portion of the sheet lifting device. The base can comprise one or more protrusions configured to create a friction fit, a snap-fit, or a compression fit in the mounting slot of the support frame. The protrusion can comprise a corner, a ridge, a rib, a plurality of corners, cut-off corners, a combination thereof, or the like.

According to various embodiments, a blanking station, a stripping station, or both, are provided, and comprise a sheet lifting device described herein mounted in a mounting slot of a support frame. In addition, methods are provided for conveying a sheet or web of material along a pathway comprising a rail and a sheet lifting device as described herein disclosed along the rail. The method can comprise performing a stripping or blanking operation on a sheet or web of material while using the sheet lifting device to lift one or more portions of the sheet or web of material.

BRIEF DESCRIPTION OF THE DRAWINGS

The present teachings will be more fully understood with reference to the accompanying drawings which are intended to illustrate, not limit, the present teachings.

FIG. 8 is a side view of the system shown in FIG. 7 in a depressed state and illustrates a presser bar forcing the resilient, bendable arm into a complementary recess formed in the support frame.

DETAILED DESCRIPTION

Figure 1:
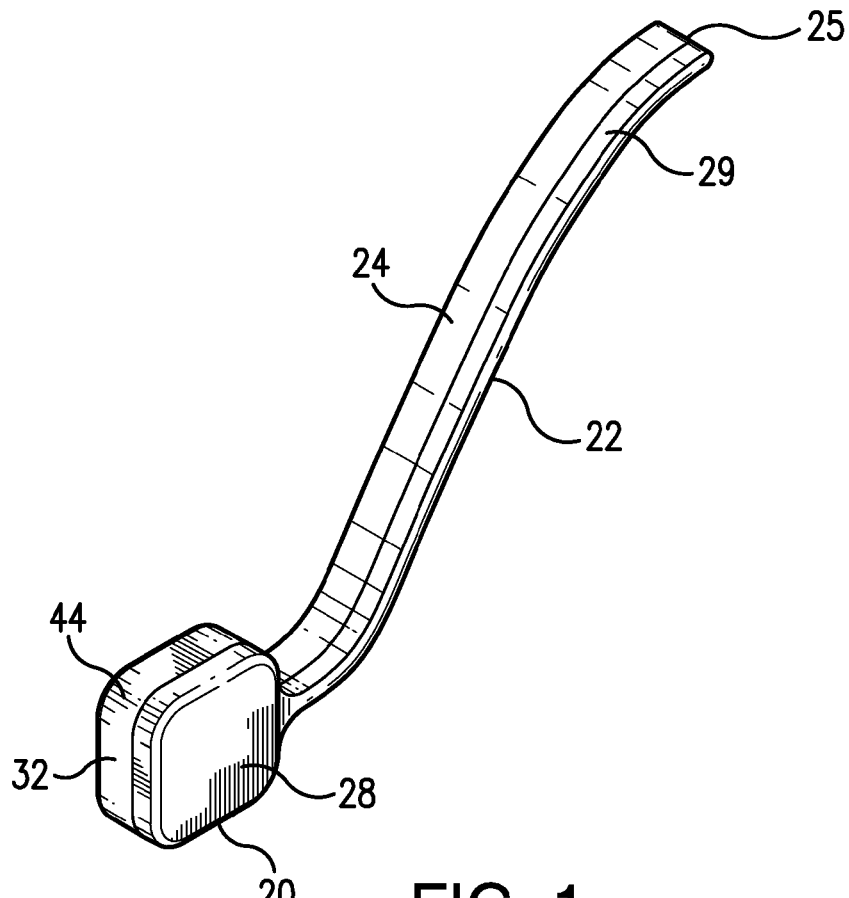
FIG. 1 is a top, left-side perspective view of a sheet lifting device according to various embodiments of the present teachings.

According to various embodiments, the sheet lifting device of the present teachings comprises a base portion and a resilient, bendable arm extending from the base portion. The base portion can comprise a body having a first surface, a second surface opposite the first surface, at least a first sidewall including a vertical portion, and at least one merge portion along the sidewall. The merge portion can merge into, for example, and be continuous with, the resilient, bendable arm.

In some embodiments, the base portion can have a first depth, for example, defined as a distance between the first surface and the second surface. The merge portion can have a depth that is substantially equal to the depth of the base portion. Further, the resilient, bendable arm can have a depth that is substantially equal to the depth of the merge portion and the depth of the base portion. In use, the sheet lifting device can be mounted in a slot and the slot can have a depth that is about equal to the depth of the base portion. In some embodiments, the depth of the base portion, the depth of the merge portion, and the depth of the resilient, bendable arm are equal to one another.

The at least one sidewall can comprise a single sidewall if the base portion is of circular cross-section. In some embodiments, the base portion can have a square cross-section such that four sidewalls are provided. In some embodiments, at least four sidewalls are provided on the base portion and the base portion can comprise cut-off corners at the intersections of the sidewalls. Rounded corners can also be used.

The merge portion can be configured to provide a connection between the resilient, bendable arm and the base portion. In some embodiments, the merge portion can intersect with and extend from about the middle of the sidewall vertical portion. In other embodiments, the merge portion can extend from a bottom of the vertical portion, a top of the vertical portion, or from elsewhere along the sidewall of the base portion. According to various embodiments, the resilient, bendable arm can extend substantially horizontally from the merge portion. Herein, by substantially horizontally, what is meant is horizontally, or at a slight angle, for example, from ten degrees above horizontal to ten degrees below horizontal. After extending substantially horizontally, the resilient, bendable arm curves upwardly in a first direction and extends above the base portion when viewed from an operational perspective. The resilient, bendable arm can extend above a top surface of the base portion, and/or above a top of a vertical portion of the sidewall. Near a distal end of the resilient, bendable arm, the arm then curves in a second direction that is substantially opposite the first direction of curvature. In some embodiment, the arm extends substantially horizontally from the merge portion, then curves upwardly in a first direction extending above the top of the vertical portion of the sidewall, and then curves in a substantially opposite direction to again extend substantially horizontally.

The base portion can comprise a leading edge surface, a top surface, and a bottom surface. The at least one sidewall can comprise at least one protrusion configured to create a friction fit, a snap-fit, or a compression fit in a mounting slot of a support frame. The at least one protrusion can comprise a plurality of protrusions, for example, one or more corners, one or more rounded corners, or one or more cut-off corners. Ribs, edges, nodules, or other surface features can be provided along the sidewall of the base portion to ensure a snug fit and good grip with in a retaining slot. The first and second surfaces of the base portion can be substantially square, round, rectangular, triangular, or of any other shape. The first surface, the second surface, or both, can comprise a concave depression in some embodiments.

The sheet lifting device can be made of one-piece construction, for example, integrally molded from a polymeric material. In some embodiments, the sheet lifting device can be made of multiple parts and assembled, or co-injected if the device comprises two or more different materials. In some embodiments, the sheet lifting device comprises a molded acetal resin material, a fluorinated plastic, a polyalkylene material or blend, a combination thereof, or a like material. In some cases, the device can be made of DELRIN, an acetal resin available from E.I. du Pont de Nemours and Company, Wilmington, Del.

In some embodiments, the present teachings encompass an entire system comprising a sheet lifting device as described herein mounted in a mounting slot of a support frame. The support frame can comprise a retaining board, or rail of a sheet manipulating press, for example, a stripping press, a blanking press, a die-cutting press, or the like. The support frame can comprise a slot and the sheet lifting device can be at least partially disposed in the slot. In some embodiments, the support frame can comprise an inner surface and the sheet lifting device can be mounted in a slot such that it does not protrude inside the inner surface of the support frame, for example, so as not to prevent a blank from falling through an opening at least partially defined by the support frame. The flap in the support frame can comprise an inner sidewall that can be configured to be substantially complementary to the sidewall of the base portion of the sheet lifting device. For example, the slot in the support frame can have a substantially square opening and the base portion of the sheet lifting device can have a substantially square cross-section. The support frame can comprise a top surface and a recess disposed in the top surface, the recess can be configured to receive the resilient, bendable arm when the resilient, bendable arm is in a deflected position, for example, under the force of a presser bar or other pressing mechanisms. Although not necessary, the recess can be continuous with the slot in the support frame and/or can comprise an opening through an entire thickness of the support frame, that is, a thickness in a horizontal direction. The recess can be sufficiently deep to completely receive the entire resilient, bendable arm in a deflected position, for example, such that the resilient, bendable arm can be deflected to be flush with or below a top surface of the support frame. The recess can comprise a shape that is complementary to a shape of the resilient, bendable arm. In some embodiments, the recess comprises a convex, arced, shape or surface. The resilient, bendable arm can be completely received in the recess in a completely deflected position.

In some embodiments, the support frame comprises a top surface, the slot comprises a slot top surface, and the slot top surface is below the top surface of the support frame. The distance below the top surface of the support frame can be about equal to a height of the base portion, or can be equal to a value within the range of from about 10% to about 200% the height of the base portion, for example, from about 50% to about 100% the height of the base portion. In some embodiments, the support frame can comprise a rail in a paper or paperboard press, for example, a rail in a blanking station or stripping station of a paper or paperboard press.

In yet other embodiments of the present teachings, a method of conveying a sheet or web of material is provided. The method can comprise conveying a sheet or web of material along a pathway, wherein the pathway comprises a rail and a sheet lifting device as described herein disposed along the rail. The conveying can comprise contacting the sheet or web of material with the rail and with the sheet lifting device. The resilient, bendable arm of the sheet lifting device can extend from a slot in the rail to a position above a top surface of the rail such that the sheet lifting device lifts a paper or paperboard off of the rail as the paper or paperboard is conveyed along the rail. The method can comprise deflecting the resilient, bendable arm toward the rail by pushing down on the sheet or web of material. The downward force can be applied by a pressing device, a presser bar, a punch, or the like, while the sheet or web of material is in contact with the resilient, bendable arm. Once the force is released, the resilient, bendable arm can resume a normal position and, in doing so, lift the sheet or web of material off of the rail. In some embodiments, the method comprises performing a stripping or blanking operation on the sheet or web of material, for example, while the sheet or web of material is in contact with the sheet lifting device.

The present teachings can be used in manipulating paper, paperboard, plastic, cardboard, poster board, film, sheet, web, and other materials and combinations thereof.

Figure 4:
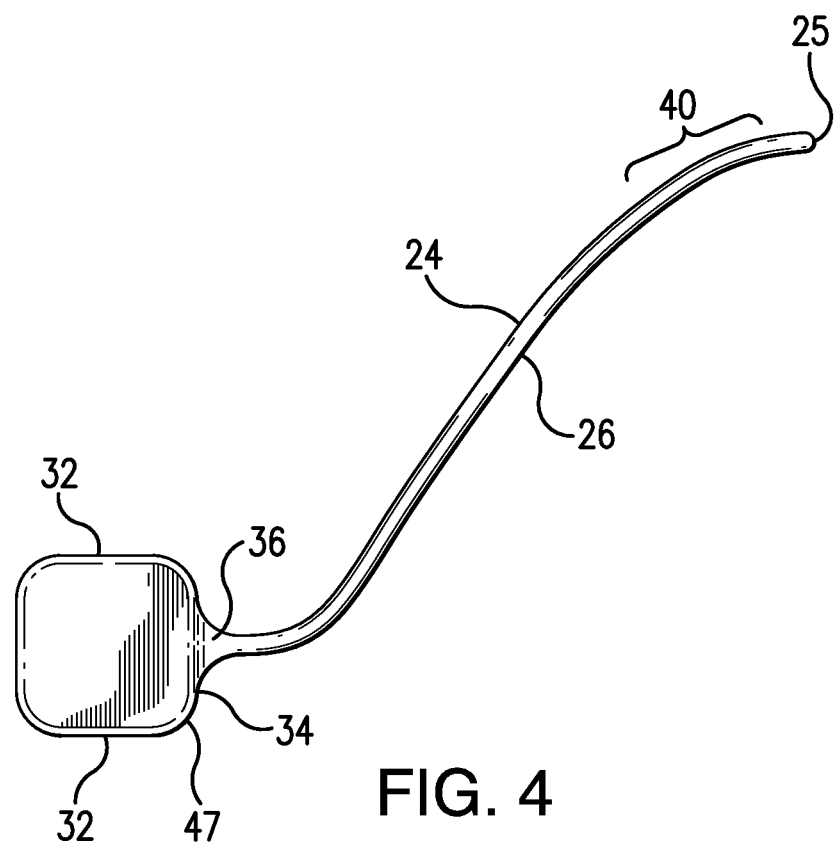
FIG. 4 is a side view of the sheet lifting device shown in FIG. 1.
Figure 5:
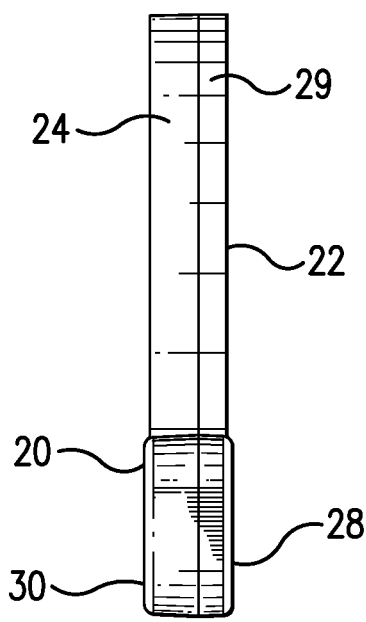
FIG. 5 is a top view of the sheet lifting device shown in FIG. 1.
Figure 6:
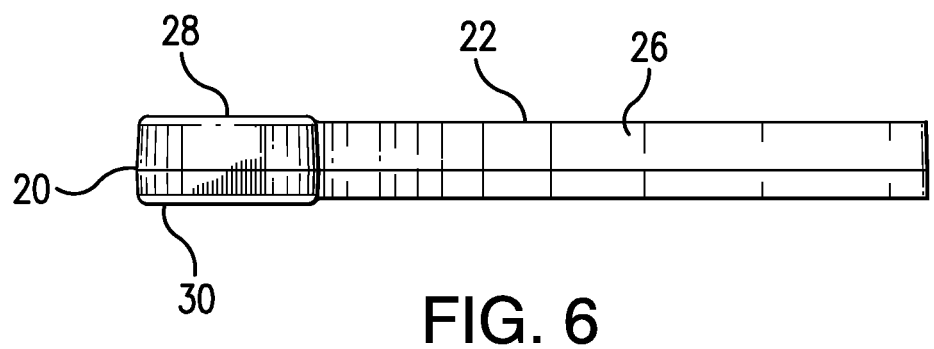
FIG. 6 is a bottom view of the sheet lifting device shown in FIG. 1.

With reference now to the drawings, FIGS. 1-6 show various views of a sheet lifting device according to various embodiments of the present teachings. The sheet lifting device comprises a base portion 20 and a resilient, bendable arm 22. Base portion 20 has opposing major surfaces 28 and 30, and a sidewall 32. Sidewall 32 has two substantially vertical portions and two substantially horizontal portions in the embodiment shown. A first sidewall vertical portion 34 is arranged on a side of body 20 from which resilient, bendable arm 22 extends. Resilient, bendable arm 22 merges into vertical portion 34 at a merge portion 36 that diverges in a direction from arm 22 toward base portion 20. FIGS. 5 and 6 show the depth dimension of the sheet lifting device whereas FIG. 4 does not show the depth dimension as the depth dimension goes into the page relative to the view shown in FIG. 4. As can be seen in FIGS. 5 and 6, resilient, bendable arm 22 can have a depth that is substantially equal to the depth of merge portion 36 and the depth of base portion 20.

Base portion 20 can be provided with one of more features to help secure the sheet lifting device in a slot, a frame, a retaining board, or another support. As seen in FIGS. 1-6, base portion 20 is provided with four rounded corners, 44, 45, 46, and 47. Sidewall 32 of base portion 20 can further be provided with protrusion or other features such as protrusions 42 shown in FIG. 8, although the embodiment shown in FIG. 8 differs from that shown in FIGS. 1-6. As seen in FIG. 4, merge portion 36 intersects with and extends from about the middle of sidewall vertical portion 34. Resilient, bendable arm 22 extends substantially horizontally from merge portion 36. After shortly extending horizontally, resilient, bendable arm 22 bends upwardly at a first curved portion 38 shown in FIG. 2. From first curved portion 38, resilient, bendable arm 22 then extends at an angle of approximately 45 degrees with respect to the flat top surface of base portion 20 until it reaches a second curved portion 40 where resilient, bendable arm 22 then curves in a direction opposite the direction of curvature of first curved portion 38. At a most distal point 25, resilient, bendable arm 22 points in a substantially horizontal direction.

Figure 2:
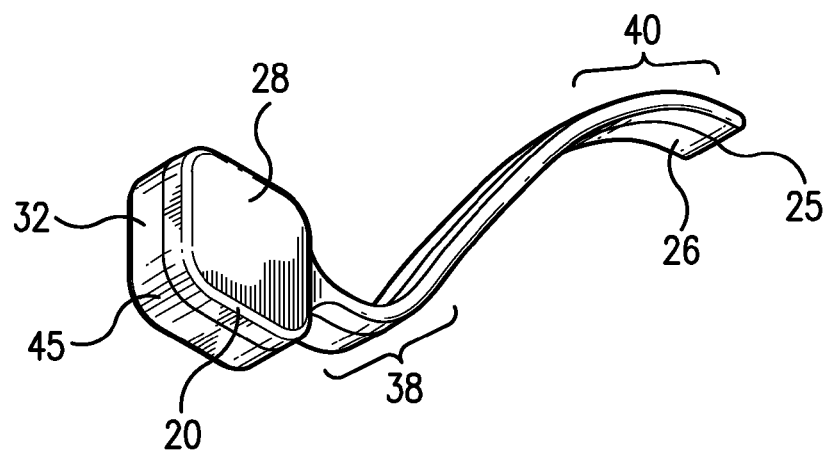
FIG. 2 is a bottom, right-side perspective view of the sheet lifting device shown in FIG. 1.
Figure 3:
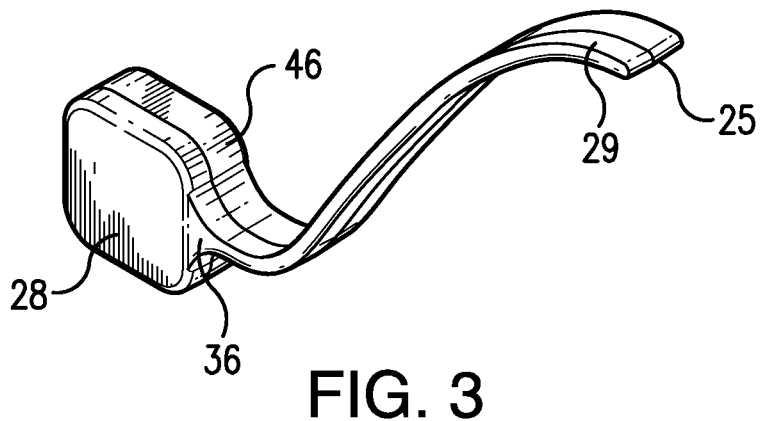
FIG. 3 is a top, right-side perspective view of the sheet-lifting device shown in FIG. 1.

As shown in FIGS. 1 and 2, resilient, bendable arm 22 has a top surface 24 and a bottom surface 26, and can be tapered along one or more edges. As seen in FIGS. 1, 3, 5, and 6, resilient, bendable arm is provided with a tapered edge 29 along its entire length.

Figure 7:
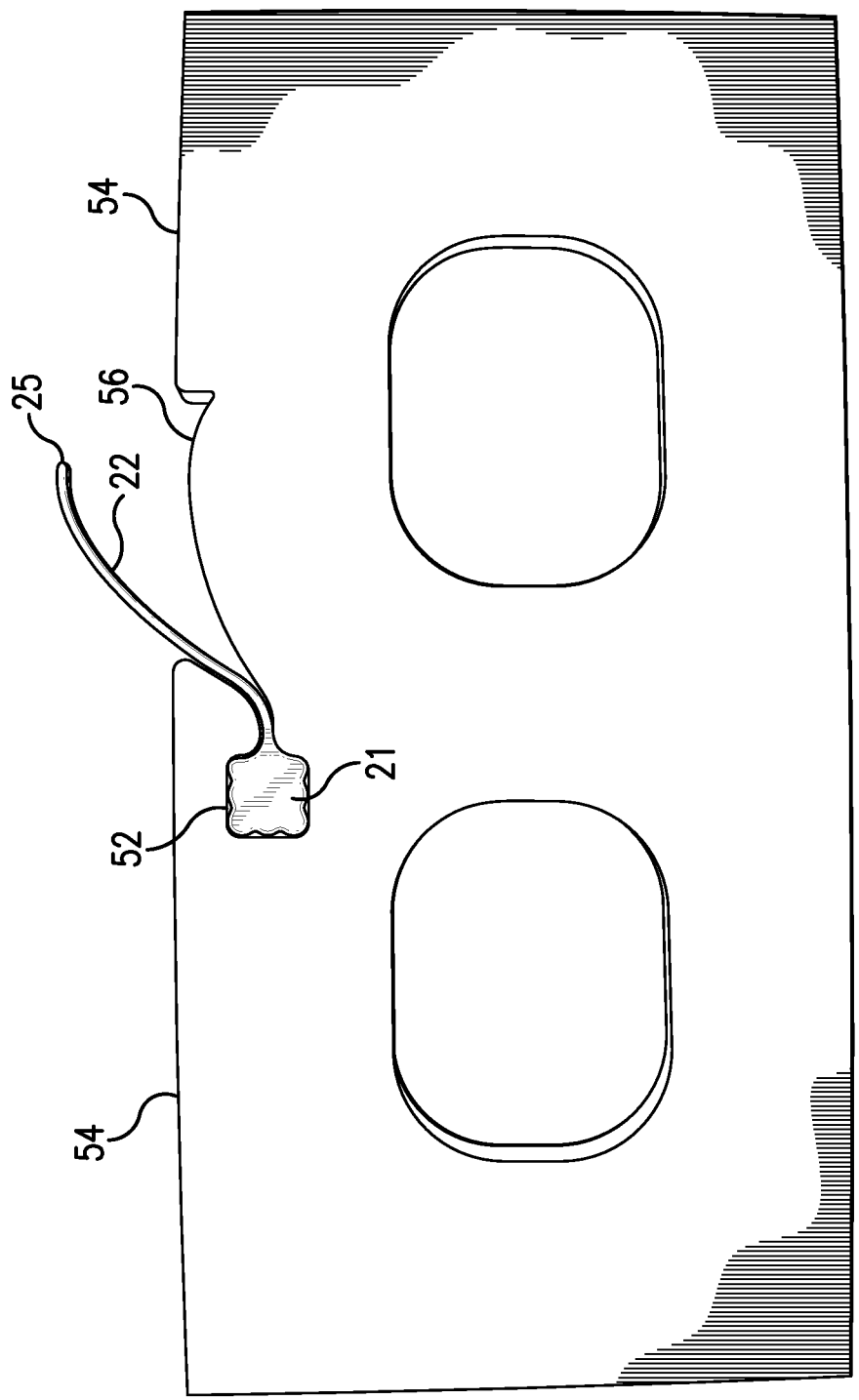
FIG. 7 is a side view of a system according to various embodiments of the present teachings and comprising a sheet lifting device disposed in a mounting slot of a support frame and showing the resilient, bendable arm of the sheet lifting device rising above a top, sheet-supporting surface of the support frame.

With reference to FIGS. 7 and 8, a sheet lifting device according to yet another embodiment of the present teachings is shown disposed in a slot 52 of a support frame 50. Support frame 50 can be a rail in a press, for example, a rail of a blanking press or stripping press. Support frame 50 can be provided with a top surface 54 for supporting a sheet or web of material travelling through the press. As can be seen, slot 52 is positioned below top surface 54 such that, when the sheet lifting device is operatively positioned, resilient, bendable arm 22 rises from the slot and extends upwardly to above top surface 54 of support frame 50. Support frame 50 is also provided with a recess 56 to accommodate resilient, bendable arm 22 when resilient, bendable arm 22 is forced downwardly toward support frame 50, for example, under the force of a presser bar 60 as shown in FIG. 8. Recess 56 can be provided with a curved top surface complementary to curved bottom surface of resilient, bendable arm 22. As can be seen, slot 52 has an inner periphery that corresponds closely to the outer periphery of base portion 21 of the sheet lifting device shown in FIGS. 7 and 8. Base portion 21 of the sheet lifting device is provided with a plurality of protrusions 42 that can help secure the sheeting lifting device within slot 52. Base portion 21 can also be provided with concave major surfaces, similar to surfaces 28 and 30 shown in FIGS. 1-6 but being concave.

All publications, patents, and patent applications mentioned in this specification are herein incorporated by reference to the same extent as if each individual publication, patent, or patent application was specifically and individually indicated to be incorporated by reference.

While embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

Other embodiments will be apparent to those skilled in the art from consideration of the present specification and practice of various embodiments disclosed herein. It is intended that the present specification and examples be considered as exemplary only.

What is claimed is:

1. A method of conveying material, comprising:
   conveying a sheet or web of material along a pathway, the pathway comprising a rail and a sheet lifting device extending from the rail and having a resilient, bendable arm, the rail comprising a slot and the sheet lifting device being at least partially disposed in the slot, the rail comprising a top surface, a recess disposed in the top surface, and a rail sidewall, the recess being configured to completely receive the resilient, bendable arm when the resilient, bendable arm is in a completely deflected position, the recess and the slot constituting a continuous opening through a thickness of the rail, the slot comprising an opening in the rail sidewall, and system being configured such that the sheet lifting device is capable of being inserted into the slot only through the opening in the rail sidewall and not through the top surface of the rail, the conveying comprising contacting the sheet or web of material with the rail and with the sheet lifting device, wherein the sheet lifting device comprises
   a base portion and the resilient, bendable arm extending from the base portion, the base portion comprising a body having a first surface, a second surface opposite the first surface, at least a first outer sidewall including a top wall, a bottom wall, a vertical sidewall extending between and intersecting with the top wall and the bottom wall, and a merge portion along the vertical sidewall, the merge portion being defined by two opposing concave surfaces that converge into the resilient, bendable arm, wherein the base portion has a first depth, the merge portion has a second depth that is substantially equal to the first depth, the resilient, bendable arm has a third depth that is substantially equal to the second depth, the merge portion intersects with and extends from about the middle of the vertical sidewall, a first of the opposing concave surfaces extends from adjacent the top wall to the resilient, bendable arm, a second of the opposing concave surfaces extends from adjacent the bottom wall to the resilient, bendable arm, the first and second opposing concave surfaces mirror one another, and the resilient, bendable arm extends substantially horizontally from the merge portion in a first direction, then curves upwardly, extends above the top wall, and then curves in a second direction that is substantially parallel to the first direction, substantially horizontally, and away from the base portion;
   deflecting the resilient, bendable arm toward the rail by pushing down on the sheet or web of material with a force while the sheet or web of material is in contact with the resilient, bendable arm; and
   releasing the force, causing the resilient, bendable arm to lift the sheet or web of material off of the rail.

2. The method of claim 1, further comprising performing a stripping or a blanking operation on the sheet or web of material.

3. The method of claim 1, wherein the sheet or web of material comprises at least one of paper, paperboard, and plastic.

4. A system comprising a sheet lifting device and a support frame, the support frame comprising a slot and the sheet lifting device being at least partially disposed in the slot,
the sheet lifting device comprising
a base portion and a resilient, bendable arm extending from the base portion, the base portion comprising a body having a first surface, a second surface opposite the first surface, at least a first outer sidewall including a top wall, a bottom wall, a vertical sidewall extending between and intersecting with the top wall and the bottom wall, and a merge portion along the vertical sidewall, the merge portion being defined by two opposing concave surfaces that coverage into the resilient, bendable arm,
wherein the base portion has a first depth, the merge portion has a second depth that is substantially equal to the first depth, the resilient, bendable arm has a third depth that is substantially equal to the second depth, the merge portion intersects with and extends from about the middle of the vertical sidewall, a first of the opposing concave surfaces extends from adjacent the top wall to the resilient, bendable arm, a second of the opposing concave surfaces extends from adjacent the bottom wall to the resilient, bendable arm, the first and second opposing concave surfaces mirror one another, and the resilient, bendable arm extends substantially horizontally from the merge portion in a first direction, then curves upwardly, extends above the top wall, and then curves in a second direction that is substantially parallel to the first direction, substantially horizontally, and away from the base portion,
the support frame comprising
a rail having a top surface, a recess disposed in the top surface, and a rail sidewall, the recess being configured to completely receive the resilient, bendable arm when the resilient, bendable arm is in a completely deflected position, the recess and the slot constituting a continuous opening through a thickness of the rail, the slot comprising an opening in the rail sidewall, and the system being configured such that the sheet lifting device is capable of being inserted into the slot only through the opening in the rail sidewall and not through the top surface of the rail.

5. The system of claim 4, wherein the base portion comprises a leading edge surface, a top surface, and a bottom surface and the at least one first outer sidewall comprises at least one protrusion configured to create a friction fit, snap-fit, or compression fit in the slot of the support frame.

6. The system of claim 5, wherein the at least one protrusion comprises a plurality of protrusions.

7. The system of claim 5, wherein the at least one protrusion comprises at least one corner.

8. The system of claim 4, wherein the first and second surfaces are substantially square and the top wall and the bottom wall are of the same length and are parallel to one another.

9. The system of claim 4, wherein at least one of the first and second surfaces comprises a concave depression.

10. The system of claim 4, wherein the sheet lifting device is of one-piece construction and comprises a molded polymeric material.

11. The system of claim 4, wherein the sheet lifting device comprises a molded acetal resin material.

12. The system of claim 1, wherein the slot has an inner sidewall that is substantially complementary to the first outer sidewall of the base portion.

13. The system of claim 11, wherein the recess comprises a convex arched surface.

14. The system of claim 4, wherein the support frame comprises a top surface, the slot comprises a slot top surface, and the slot top surface is below the top surface of the support frame.

15. A system of claim 4, wherein the rail is in a paper or paperboard press.

16. A blanking station comprising the system of claim 4.

17. A stripping station comprising the system of claim 4.

18. A system comprising a sheet lifting device and a support frame, the support frame comprising a slot and the sheet lifting device being at least partially disposed in the slot,
the sheet lifting device, comprising
a base portion and a resilient, bendable arm extending from the base portion, the base portion comprising a body having a first surface, a second surface opposite the first surface, at least a first outer sidewall including a top wall, a bottom wall, a vertical sidewall extending between and intersecting with the top wall and the bottom wall, and a merge portion along the vertical sidewall, the merge portion being defined by two opposing concave surfaces that coverage into the resilient, bendable arm,
wherein the merge portion intersects with and extends from about the middle of the vertical sidewall, and the resilient, bendable arm extends substantially horizontally from the merge portion in a first direction, then curves upwardly and extends above the top wall, and then curves in a second direction that is substantially parallel to the first direction, substantially horizontally, and away from the base portion,
the support frame comprising
a rail having a top surface, a recess disposed in the top surface, and a rail sidewall, the recess being configured to completely receive the resilient, bendable arm when the resilient, bendable arm is in a completely deflected position, the recess and the slot constituting a continuous opening through a thickness of the rail, the slot comprising an opening in the rail sidewall, and the system being configured such that the sheet lifting device is capable of being inserted into the slot only through the opening in the rail sidewall and not through a top surface of the rail.

* * * * *